April 27, 1926.  
J. A. HUNTER  
COTTON STALK PULLER AND BINDER  
Filed Sept. 24, 1923

Inventor  
J. A. Hunter,  
by

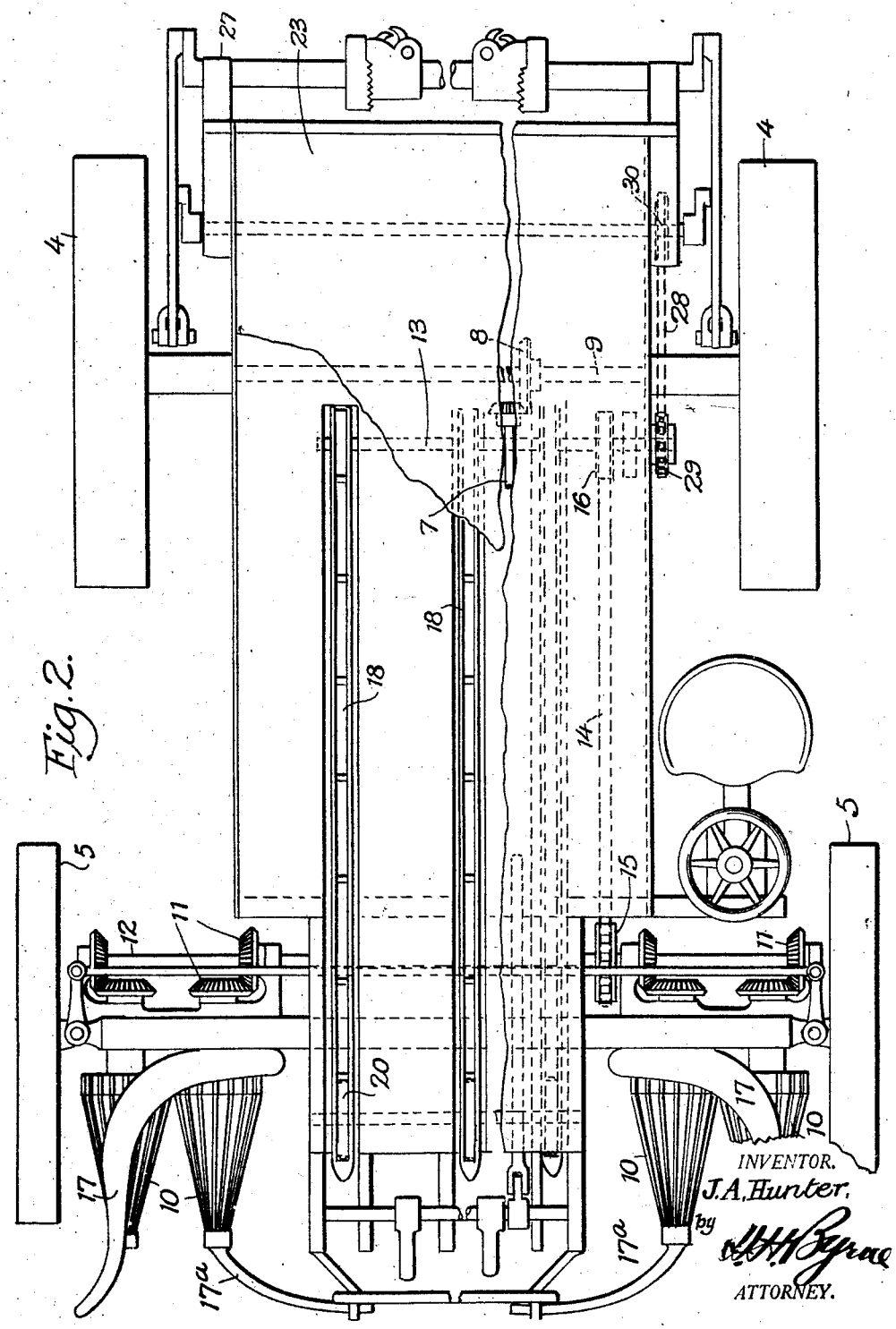

Patented Apr. 27, 1926.

1,582,403

UNITED STATES PATENT OFFICE.

JAMES A. HUNTER, OF MEMPHIS, TENNESSEE.

COTTON-STALK PULLER AND BINDER.

Application filed September 24, 1923. Serial No. 664,430.

*To all whom it may concern:*

Be it known that I, JAMES A. HUNTER, a citizen of the United States, residing at Memphis, in the county of Shelby and State of Tennessee, have invented certain new and useful Improvements in Cotton-Stalk Pullers and Binders, of which the following is a specification.

The present invention relates to cotton stalk pullers, and consists in the combinations and arrangements of elements hereinafter described and particularly set forth in the accompanying claim.

The invention has for its purpose to provide a vehicle equipped with means for extracting cotton stalks from the ground and conveying the same to a suitable form of bundling or baling apparatus mounted on the vehicle, and operable to drop the tied bundles at suitable intervals.

The invention is further characterized in that a crusher is associated with the conveyor to the end that the conveyed stalks are partially packed or bundled prior to delivery to the baler or bundling device per se, thereby increasing the efficiency of the apparatus and affording a relatively small, compact, and self-contained machine on the vehicle.

The invention is shown by way of illustration in the accompanying drawing, wherein:

Fig. 2 is a top plan view thereof with parts broken away for clearness.

Figure 1:
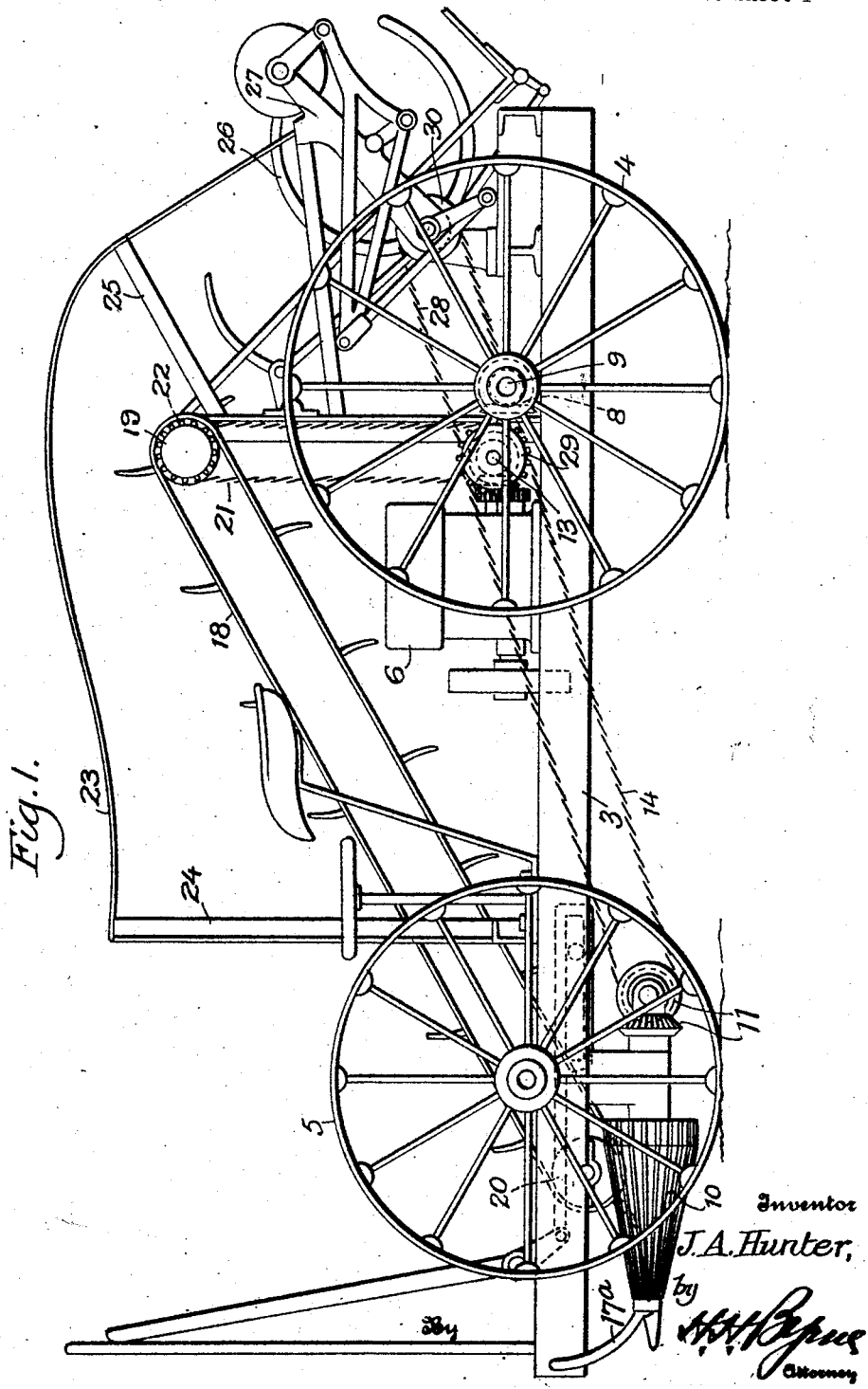
Figure 1 is a side elevational view of the apparatus complete.

Referring to the construction in further detail, and wherein like reference characters designate corresponding parts, 3 indicates the body or frame of the vehicle, 4 the tractor wheels thereof, and 5 the steering wheels as shown. A motor 6, of any suitable type, is mounted on the frame 3 and through its shaft 7 has gearing connection 8 with the axle 9 for driving the wheels 4.

Mounted on each side of the vehicle, and at the front, is a pair of truncated and fluted, or corrugated rollers 10 so located with respect to the ground that said rollers will positively grip the cotton stalks and pull the same with their roots from the soil. It will be evident that the increasing diameters of said rollers will cause the stalks to be pulled with increasing speed after the pulling operation has begun.

Each pair of rollers 10 is mounted on shafts (not shown) connected to be driven by mitre gears 11 through the countershaft 12. Said shaft 12 is connected to be driven from the shaft 13 by a chain and sprocket drive (14, 15 and 16).

Suitable deflectors or guides 17 and $17^a$ are mounted adjacent each pair of rollers 10 and have for their purpose to direct the pulled stalks onto the conveyor belts 18. Each of the conveyor belts 18 is suitably journaled on pulleys 19 and 20 that are connected to be driven from the motor by the chain and sprocket drive 21 and 22.

To the end that the stalks carried on the conveyor may be initially packed or crushed there is provided an overlying plate or hood 23, suitably supported by the brackets 24 and 25 and so designed that the moving stalks are gradually compressed and in that condition finally delivered to the baler or bundling apparatus 26 suitably mounted on the arms 27, as shown. For this purpose the plate or hood 23 is so positioned with relation to the conveyor belts 18 that a large mouth as at 24 is formed at the receiving ends of the belts 18 while a narrow throat is formed at the delivery end thereof as at 19, or in other words, a gradually narrowing passage is provided for the cotton stalks. No claim is made to the baler here disclosed as any suitable type of such mechanism may be used. The baler is operated from the shaft 13 by any suitable driving connection e. g. chain 28 and sprockets 29 and 30.

It is obvious that those skilled in the art may vary the details of construction and arrangements of parts without departing from the spirit of my invention, and therefore I do not wish to be limited to such features except as may be required by the claim.

What I claim as new is:—

In a cotton stalk harvester the combination with a vehicle having rollers for pulling the cotton stalks and means for bundling the same; of a conveyor for carrying the stalks from said rollers to the bundling means, compressing means for the stalks cooperable with the conveyor, and gearing for operating the conveyor, said compressing means comprising a curved sheet metal plate located over the conveyor and arranged to provide a large mouth at the receiving end of the conveyor and a gradually narrowing throat towards the delivery end thereof, and supporting brackets for the sheet metal plate at said mouth and said throat, substantially as set forth.

In testimony whereof I affix my signature.

JAMES A. HUNTER.